US007365516B2

(12) United States Patent
Leyten et al.

(10) Patent No.: US 7,365,516 B2
(45) Date of Patent: Apr. 29, 2008

(54) MULTI-VOLTAGE POWER SUPPLY SYSTEM AND METHOD FOR OPERATING SAME

(75) Inventors: Max Leyten, Vaals (NL); Lutz Gaedt, Baesweiler (DE)

(73) Assignee: Ford Global Technologies, LLC, Dearborn, MI (US)

( * ) Notice: Subject to any disclaimer, the term of this patent is extended or adjusted under 35 U.S.C. 154(b) by 408 days.

(21) Appl. No.: 11/051,690

(22) Filed: Feb. 4, 2005

(65) Prior Publication Data

US 2005/0212495 A1  Sep. 29, 2005

(30) Foreign Application Priority Data

Feb. 5, 2004  (EP)  ................... 04100434

(51) Int. Cl.
*H01M 10/44* (2006.01)
*H01M 10/46* (2006.01)

(52) U.S. Cl. ..................................... 320/116
(58) Field of Classification Search ................ 320/103, 320/107, 116, 120
See application file for complete search history.

(56) References Cited

U.S. PATENT DOCUMENTS 5,656,915 A  8/1997  Eaves

FOREIGN PATENT DOCUMENTS

| DE | 196 28 222 A1 | 1/1998 |
| DE | 199 52 334 A1 | 5/2001 |
| DE | 100 57 259 A1 | 5/2002 |
| EP | 0 850 506 B1 | 3/1997 |
| EP | 1 295 757 A2 | 3/2003 |

*Primary Examiner*—Edward H Tso
(74) *Attorney, Agent, or Firm*—David B. Kelley; Brooks Kushman.P.C.

(57) ABSTRACT

A multi-voltage power supply system, such as a 14V/42V dual-voltage system for vehicular applications, includes a battery arrangement and an intelligent switching regulator for providing at least a first output at a first potential and a second output at a second potential higher than the first potential. The battery arrangement includes a plurality of segments each providing an output substantially equal to the first potential. The switching regulator selectively conFIG. s each of the segments as a first part having a potential difference determined with respect to the first potential and a reference potential, e.g., ground, such that the power supply system provides the first and second outputs while minimizing degradation of the segments.

32 Claims, 5 Drawing Sheets

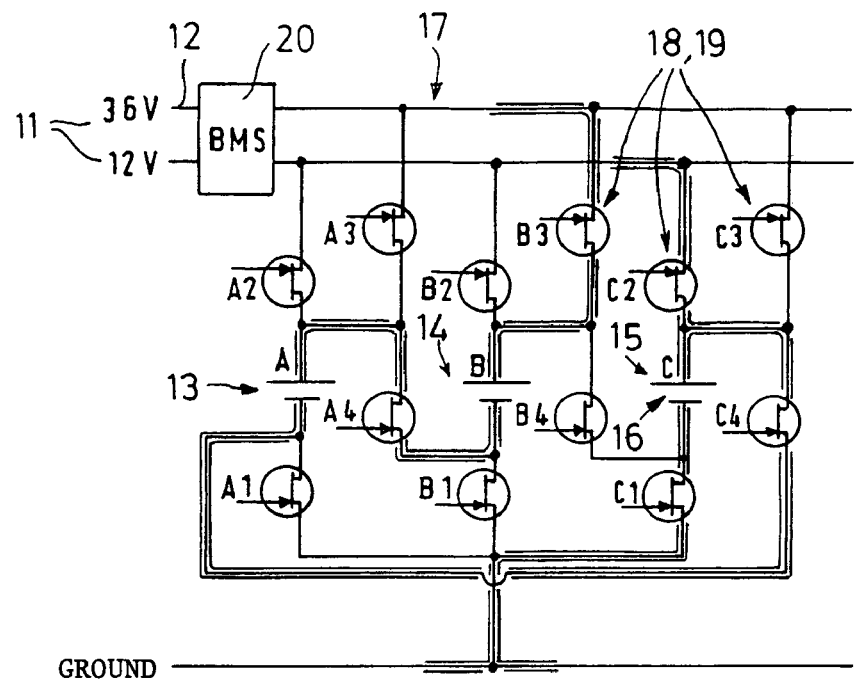
Fig.6
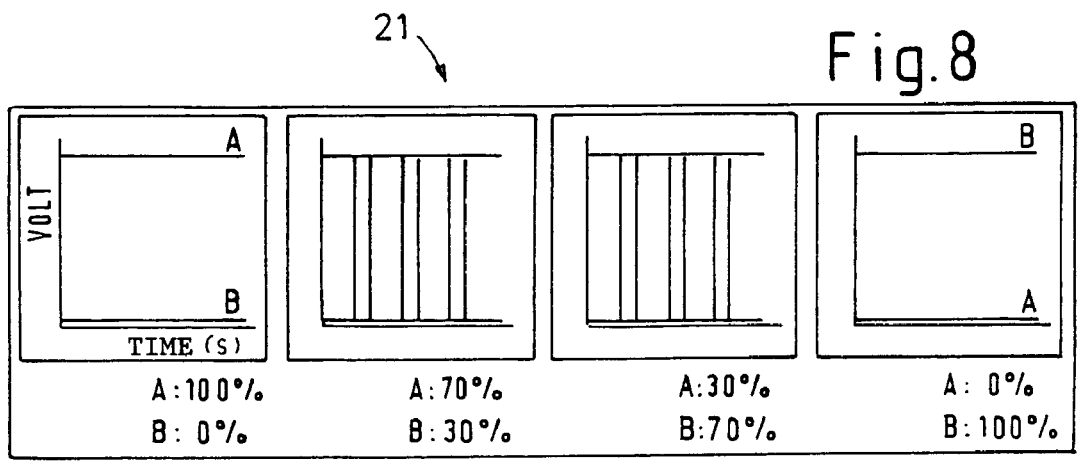
Fig.7
Fig.8

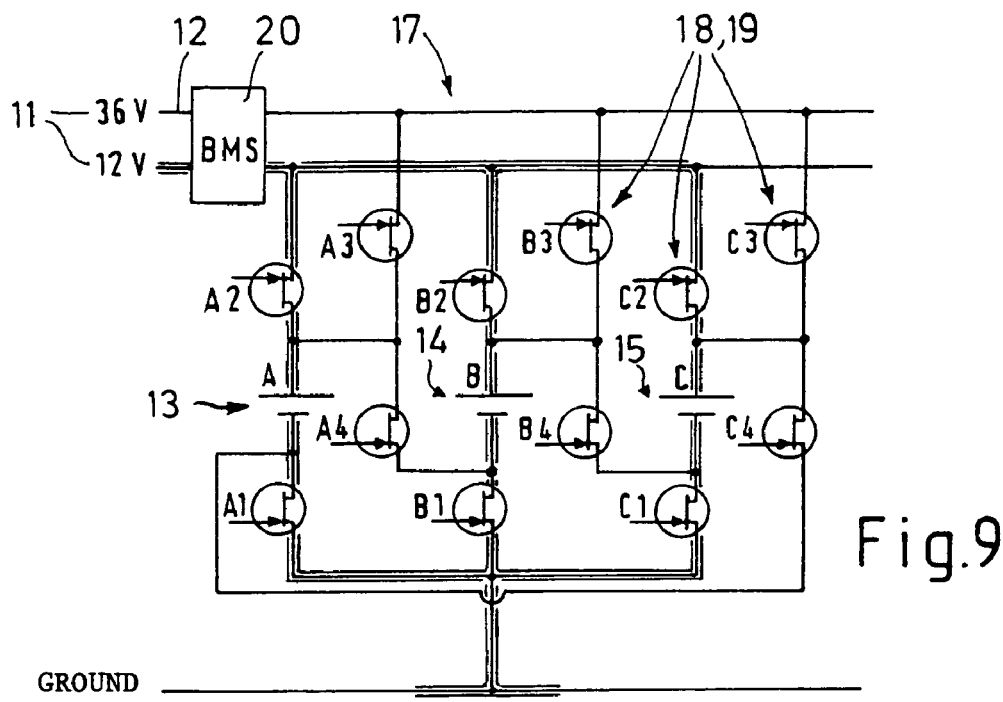
Fig. 9
| | 18,19 | | | | | | | | | | | |
|---|---|---|---|---|---|---|---|---|---|---|---|---|
| | A1 | A2 | A3 | A4 | B1 | B2 | B3 | B4 | C1 | C2 | C3 | C4 |
| 12 V | 1 | 1 | 0 | 0 | 1 | 1 | 0 | 0 | 1 | 1 | 0 | 0 |
Fig. 10
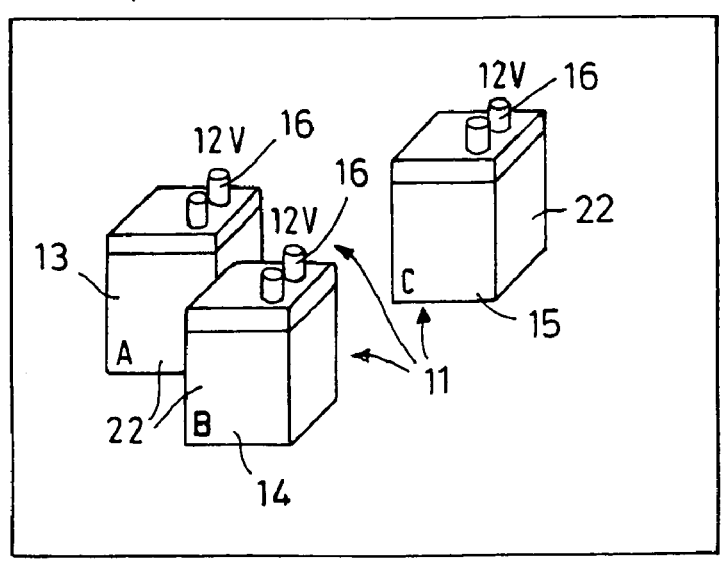
Fig. 11

MULTI-VOLTAGE POWER SUPPLY SYSTEM AND METHOD FOR OPERATING SAME

BACKGROUND OF THE INVENTION

1. Field of the Invention

The invention relates to a multi-voltage power supply system, and more specifically to a dual-voltage power supply system for vehicles having a two-voltage storage system such as a 14/42 V two-voltage system.

2. Background Art

Multi-voltage level power supply systems, such as 14/42 V two-voltage ("dual voltage") systems, are known in the art. In the case of 14/42 V systems, such systems have been developed in order to facilitate the transition from a conventional 14 V electrical system to an electrical system operating at a 42 V level. However, one disadvantage of these systems is the need for more than one energy storage device in order to accommodate the energy requirements for high power output loads.

In a conventional automobile, for a example, a single 12 V battery is used as the device for energy storage for the 14V bus. However, in many applications for 14V/42V systems, it is often necessary to use two separate devices for energy storage in order to allow arrangements with the characteristics of the two batteries. Against this background, it is desirable to provide a vehicular power supply system having a two-voltage storage system, wherein costs can be reduced, weight saved, packaging ("accommodation") flexibility improved and short-term high-power requirements satisfied for vehicle start-up. The desired solution should not require the use of a two-voltage output generator or of a 42/12 V DC/DC converter, depending on the overall electrical load requirement on the 14 V side of the system.

An advantage of the present invention is to use a single battery which allows the energy required for a starting process to be provided in all circumstances. In addition to this, it should be possible to switch to a parallel arrangement when a high battery capacity is required.

Advantageously, the present system includes a 12 V electrical energy storage capability (for the 14V bus) and storage functionality for 36 V devices (for the 42V bus). This avoids the need for a separate 12 V battery, thus saving weight and the required accommodation space. Ideally, the accommodation space requirement for a 36 V device for energy storage would remain the same in comparison with the accommodation space requirement for a 36 V battery in a two-battery arrangement. Because a 36 V battery can be regarded as three series-connected 12 V batteries, the 12 V energy storage function may be provided by the provision of three positive battery poles (e.g., 12 V, 24 V, 36 V) as well as the battery ground.

However, there exist two problems in designing an arrangement as proposed. On the one hand, differences occur in the states of charge of the various cells in the battery, because the battery is charged at a 42 V level and energy is additionally drawn from those cells which provide the functionality for the 12 V part of the electrical energy storage. Secondly, this additional discharging of these cells by the 14 V part of the power network (if no DC/DC converters are available) results in the battery cells carrying out unequal work, so that they have a different aging distribution over time. Since this will shorten the general life expectancy of the battery, a change to this approach is required for the electrical two-voltage power supply system.

In order now to avoid aging of only some of the cells in the 36 V battery, it is necessary in addition to distribute the drawing of electrical energy from the battery over the various cells. In the following text, the 36 V battery is therefore regarded as three separate 12 V parts in a common housing. In this regard, an objective is to ensure that each 12 V part is switched alternately in order to incorporate the 12 V energy storage functionality as part of the electrical 36 V power supply system.

In this context, EP 1 295 757 A2 discloses a power supply system for vehicles having an energy source for supplying electrical power to a large number of electrical load groups, each at different voltage levels. In this case, a large number of load elements form each electrical load group, and a large number of output means are provided in order to deliver the electrical power for each predetermined voltage as a medium voltage from the energy source. In this case, the large number of output means are arranged in the energy source, with the large number of load elements being distributed between a number of blocks in each load group and being connected to each output element in order to ensure that the electrical energy which is being consumed simultaneously by each distributed block is essentially the same. This power supply system is intended to improve the charge equalization in the battery without having to use a special battery indication and monitoring device or a DC/DC converter, and with the desired medium voltage being delivered from the high-voltage battery.

In a modified embodiment of this implementation, the system has an energy source for supplying electrical power to an electrical load group at a low voltage and to an electrical load group at a high voltage. The energy source in this case has output connections at the ends, which are connected to the electrical load group at a high voltage, as well as a large number of central output connections in order to deliver the electrical energy for the electrical load group at the low voltage as a medium voltage from the energy source. In this case, the electrical load group at the low voltage is subdivided into a large number of blocks which are connected in an appropriate manner to each output and to the large number of central output connections, in order to allow the electrical energy which is consumed at the same time by each block to be essentially the same and, furthermore, with one of the blocks which are distributed in the electrical load group at the low voltage being set such that it has more load than the other blocks.

The power supply system which is described in this document is based on the following problem:

A standard 12 V battery (14 V power supply system) has been used for vehicles for many years. However, as a result of the addition of new functions such as electrical devices to assist starting of an engine and to assist its acceleration, such as electrically assisted steering, electrical braking and/or electrical suspension damping systems which are intended to be integrated in the relevant vehicle, the electrical capacity when using 12 V batteries is not sufficient to support these functions. Attempts have therefore been made to provide these new functions at a high voltage and at high electrical power, as well as to efficiently produce electrical energy for them, and thus to use them effectively, with the aim being to connect an energy source in an electrical system for a vehicle to a 36 V battery (to a 42 V power supply system), whose voltage is three times that of the previous systems. However, from the technical and financial points of view, a large amount of effort is required to provide only the 42 V power supply system which is intended to interact with all of the electrical devices in the vehicle, such as the valves for low voltage or the control devices with an electronic control unit. Furthermore, in the case of a solution such as this, the total charge intensity is too low for a 42 V load group. It has therefore been necessary to use a two-voltage system in the form of a 12/42 V voltage system. However, in the known solutions, the superimposition of the charging currents of the 36 V battery part and of the 12 V battery part have resulted in a problem in that the 12 V battery part is not only excessively discharged but that also this discharging of the 12 V battery part makes it necessary to provide an indication and control of the charging currents, for example by means of a costly DC/DC converter. The already described embodiment of the described power supply system is intended to overcome this problem.

Thus, in the case of a 36 V battery, three separate 12 V parts are provided in a common housing, with each 12 V part being switched alternately in order to provide the 12 V energy storage functionality additionally as part of the electrical 36 V energy storage system. In conjunction with an intelligent switching regulator which, for example, may use MOSFET switching elements or relay switching elements, it is now possible to use the 36 V battery as an electrical energy storage device for the 42 V part and for the 14 V part of the electrical system of the vehicle without involving charge differences or aging problems. In this case, a battery indication and monitoring system can be used to ensure that the switching between the three battery parts is controlled as a function of their state of charge.

However, an arrangement such as this is difficult when using electrical two-voltage energy storage systems within an electrical two-voltage system. This is because of the common grounding that is used in present-day vehicles. Specifically, in this case, the 36 V battery ground is connected to the vehicle chassis in this configuration. If the electrical 12 V energy storage functionality were to be provided in this case for the second 12 V part of the 36 V battery (24 V-12 V), the first 12 V part of the 36 V battery would be short-circuited. This necessitates a new cable harness arrangement for each 14 V charging process, because this cannot be directly connected to the vehicle chassis. A solution such as this is undesirable for cost and standardization reasons and, instead of this, it is desirable to improve this solution option.

Against the background of these known power supply systems, the invention is based on the object of improving and further developing the known arrangements while maintaining the previous advantages, in such a way that the disadvantages of the solutions discussed above are avoided, with a particular aim being to avoid the charge differences and aging problems that have been mentioned while the further aim is, in particular, to prevent the short-circuit problem described above. In this case, a further aim is to be able to manufacture the desired arrangement simply and at low cost, and for its life and reliability to comply with the existing requirements.

SUMMARY OF THE INVENTION

A multi-voltage power supply system is disclosed for providing at least a first output at a first potential and a second output at a second potential higher than the first potential. The system includes a battery arrangement having an output substantially equal to the second potential, the battery arrangement comprising a plurality of segments each providing an output substantially equal to the first potential, and a switching regulator for selectively configuring each of the segments as a first part having a potential difference determined with respect to the first potential and a reference potential such that the power supply system provides the first and second outputs while minimizing degradation of the segments. Although the invention may be applied to non-automotive applications, a dual-voltage automotive application is disclosed herein for the purpose of describing one possible embodiment of the invention.

In accordance with a first embodiment of the present invention, a multi-voltage power supply system capable of producing voltage outputs compatible 14V and 42V outputs includes a 36 V battery having three 12-volt battery segments (or alternatively individual batteries) which can be switched alternately, one of is selectively connected as a first 12-volt part between ground and 12 V, and in each case having devices for energy storage for the 14 V and 42 V system, with the 36 V battery having the device for energy storage for the 12 V system and the device for energy storage for the 42 V system.

According to the invention, this object is achieved in that the power supply system has an intelligent switching regulator for connection of each 12 V battery in the 36 V battery as a first 12 V part between ground and 12 V. This for the first time provides the capability when using simple means, for providing a power supply system which is equipped with a two-voltage energy storage system within an electrical two-voltage system while avoiding the disadvantages described above. In particular, this avoids the charge differences and aging problems which have been mentioned as well as the short-circuiting problem that has been described. The arrangement according to the invention can also be produced simply and at relatively low cost, while being highly reliable and having a long life.

In the preferred embodiment of the present invention the intelligent switching regulator for the power supply system has a number of multiple MOSFET switching elements. These switching elements particularly advantageously allow the power supply system according to the invention to be implemented with a two-voltage energy storage system. Alternatively or additionally, provision is made according to a further refinement feature of the present invention for the intelligent switching regulator in the power supply system to have a number of relay switching elements.

According to a further refinement feature of the present invention, it is recommended that the intelligent switching regulator in the power supply system be designed to connect the first 12 V battery as the first 12 V part between ground and 12 V. An embodiment of the present invention which differs from this provides for the intelligent switching regulator in the power supply system to be designed to connect the second 12 V battery as the first 12 V part between ground and 12 V. A further, third embodiment of the present invention, which differs from this, provides for the intelligent switching regulator in the power supply system to be designed to connect the third 12 V battery as the first 12 V part between ground and 12 V. In this case, the 12 V energy storage functionality is in each case provided by means of this respective first, second or third 12 V battery being connected as the first 12 V part between ground and 12 V.

A further refinement feature of the present invention provides for the intelligent switching regulator in the power supply system to have a battery indication and monitoring system for alternate switching of the three 12 V batteries in the 36 V battery which battery indication and monitoring system controls the alternate switching of the three 12 V batteries as a function of their state of charge. One expedient factor in this case is that the intelligent switching regulator in the power supply system has a switching time which is sufficiently short that the battery indication and monitoring system is not required for alternate switching overnight for balance equalization of the energy storage.

According to a further refinement feature of the present invention, it is recommended that the intelligent switching regulator in the power supply system has a very short switching time in order to avoid voltage fluctuations on the 14 V side of the system. Alternatively or additionally, a further refinement feature of the present invention provides that the intelligent switching regulator in the power supply system has a device for PWM matching in order to avoid voltage fluctuations on the 14 V side of the system. This avoids the voltage drops which occur when switching between the individual 12 V parts, with the switching strategy being based on the information obtained from the battery indication and monitoring system.

A further refinement feature of the present invention provides that the intelligent switching regulator in the power supply system is designed to connect the first, the second and the third 12 V batteries in parallel when the vehicle is stationary and in order to assist cold starting of, for example, large (diesel) engines. A refinement such as this achieves various advantages. On the one hand, the connection of the three 12 V batteries in parallel results in the battery capacity being made available in three parts at the 12 V level thus allowing the vehicle to be stopped for relatively long periods, for example at airports. A further advantage is that, in this operating mode of the system, the three different 12 V parts will be able to balance their state of charge overnight by load switching while the vehicle is not in use, so that they are all at the same state of charge. This includes the idea that, if the switching frequency is sufficiently high, there is no need for a battery indication and monitoring system for balance equalization of the energy storage overnight. The result is a uniformly distributed charge output from the three alternately switchable 12 V batteries in the 36 V battery in the power supply system, which are preferably, according to a further refinement feature of the present invention, designed to be identical. However, this parallel connection of the first, second and third 12 V batteries is also used to assist cold starting of, for example, large (diesel) engines, to be precise particularly in the winter, when the electrical 42 V unit is not able to start the engine, owing to a high level of engine friction. As soon as the engine has been started, the energy storage device is immediately switched to its 12/36 V application.

According to a final feature of the present invention, it is recommended that the three alternately switchable 12 V batteries in the 36 V battery in the power supply system be arranged in two or three separate housings. Overall, the arrangement according to the invention results in the advantage of greater battery accommodation flexibility. Because it is becoming ever more difficult with modern vehicles to accommodate the batteries in the engine bay, this results in the requirement to position the batteries at different locations. The power supply system according to the invention for vehicles with a two-voltage storage system makes it possible for the vehicle manufacture to redesign the battery housing, for example as mentioned in one, two or three housings, in order to accommodate the battery in any desired available spaces. In this case, the splitting of the 36 V battery into, for example, three smaller 12 V battery housings does not influence the functionality of the energy storage system, and the only condition is that the batteries emit approximately the same power.

The power supply system according to the invention thus achieves further advantages in addition to those already mentioned of achieving a cost reduction, a weight saving, an improvement in the accommodation flexibility and avoidance of the use of a two-voltage output generator or of a 42/12 V DC/DC converter, which can be summarized as follows.

The parallel arrangement of the three 12 V batteries results in the 12 V loads which remain in the switched-off state being supplied very well. Furthermore, the parallel arrangement of the three 12 V batteries results in a very large amount of energy being available at 12 V for cold starting, for example of large diesel engines, using a conventional 14 V starter engine instead of a 42 V electrical device, while furthermore greatly improving the battery accommodation flexibility.

BRIEF DESCRIPTION OF THE DRAWINGS

FIG. 6 is a circuit schematic of a third embodiment of a switching arrangement of an intelligent switching regulator according to the present invention;

FIG. 7 is a table showing switching states corresponding to the circuits shown in FIGS. 4-6;

FIG. 8 is a schematic illustration of PWM matching for the intelligent switching regulator according to the present invention;

FIG. 9 is a circuit schematic of a fourth embodiment of a switching arrangement of an intelligent switching regulator according to the present invention;

FIG. 10 is a table showing switching states corresponding to the circuit shown in FIG. 9;

FIG. 11 is a schematic illustration of a modified battery accommodation concept according to the present invention.

DETAILED DESCRIPTION OF THE PREFERRED EMBODIMENT(S)

Figure 1:
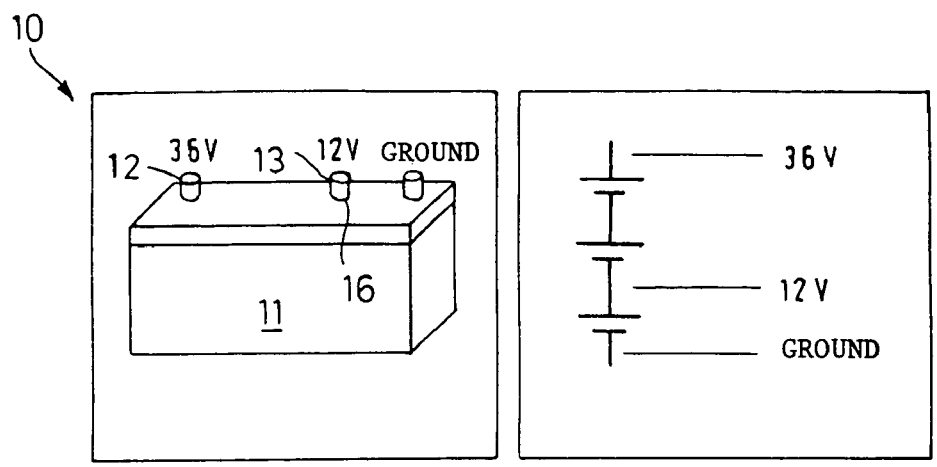
FIG. 1 is a first schematic illustration used to explain the advantages of power supply system of the present invention.
Figure 2:
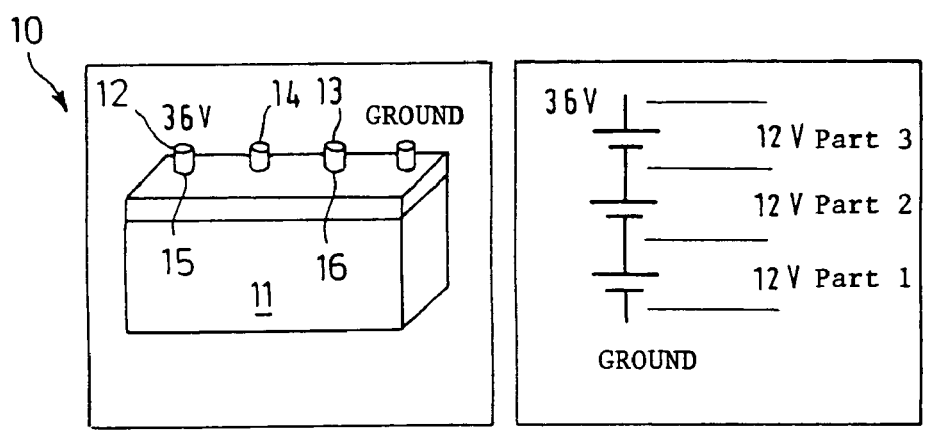
FIG. 2 is a second schematic illustration used to explain the advantages of power supply system of the present invention.
Figure 3:
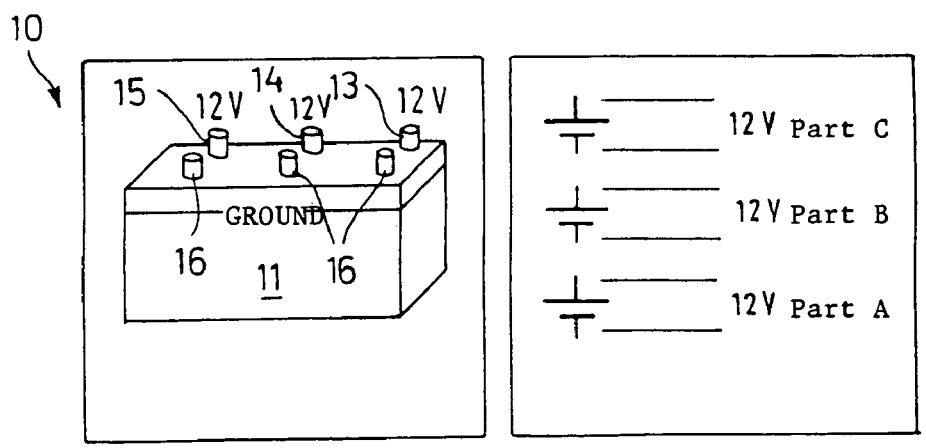
FIG. 3 is a schematic illustration of a power supply system according to an embodiment of the present invention.

The power supply system according to the invention is annotated in general by 10. For this purpose, the power supply system 10 is illustrated in the form of a number of fundamental concepts, which are still to be explained, in FIGS. 1 to 3 of the drawing. The power supply system 10 is intended for vehicles with a two-voltage storage system, comprising an electrical 14/42 V two-voltage system, which is annotated 11, with a 36 V battery 12, which essentially has three alternately switchable 12 volt batteries 13, 14, 15, of which one can be connected as the first 12 volt part 16 between ground and 12 V, and with the respective devices for energy storage for the 14 V and 42 V system, with the 36

V battery 12 including the device for energy storage for the 12 V system and the device for energy storage for the 42 V system.

Various power supply systems 10 for vehicles with a two-voltage storage system and which have a 14/42 V electrical two-voltage system 11 are known in this context. The known 14/42 V electrical two-voltage systems have been developed in order to simplify the changeover from a conventional 14 V electrical system to an electrical system at a 42 V level. One disadvantage of the introduction of an electrical power supply system 10 with a two-voltage system is the requirement for more than one device for energy storage, in order to store the energy for high power output loads.

A conventional 14 V electrical system uses a single 12 V battery as the device for energy storage. Many applications for 14/42 V electrical two-voltage systems require the use of two separate devices for energy storage, in order to allow arrangements with the characteristics of two batteries. Against the background of these known solutions, it is desirable to provide a power supply system 10 for vehicles with a two-voltage storage system, by means of which a cost reduction is achieved, weight is saved, the accommodation flexibility is improved, and which allow high power to be emitted for a short time for the starting process. In this case, the desired solution should as far as possible not require the use of a two-voltage output generator or of a 42/12 V DC/DC converter, depending on the total electrical load demand on the 14 V side of the system.

The fundamental purpose is the use of a single battery 12, which allows the energy which is required for a starting process to be produced in all circumstances. A further aim in addition to this is to allow switching to a parallel arrangement when a high battery capacity is required. The known systems do not, however, include this concept in a solution with a two-voltage storage system.

The fundamental idea on which the present invention is based is to include an electrical 12 V energy storage functionality in a 36 V main device for energy storage. A procedure such as this avoids the need for a separate 12 V battery thus saving the accommodation space required for this purpose, and thus saving weight. Ideally, the accommodation space requirement for a 36 V device for energy storage would remain the same in comparison with the accommodation space requirement for a 36 V battery 12 in a two-battery arrangement. Because a 36 V battery 12 can be regarded as three series-connected 12 V batteries 13, 14, 15, the 12 V energy storage function could in theory be provided by the addition of a third battery pole. This fundamental idea is illustrated schematically in FIG. 1 of the drawing, and a basic design of the power supply system 10 according to the invention is illustrated schematically for this purpose.

However, there are two problems in designing an arrangement such as this. Firstly, differences in the states of charge occur between the various cells in the battery 12, because the battery 12 is charged at a 42 V level and energy is additionally drawn from those cells which provide the functionality for the 12 V part of the electrical energy storage. Secondly, this additional discharging of these cells by the 14 V part of the power network (if no DC/DC converter is available) results in the battery cells carrying out unequal work, thus resulting in unequal aging distribution after a certain time. Since this will shorten the general life expectancy of the battery, a change to this approach is required for the electrical two-voltage energy storage system.

In order to avoid only some of the cells in the 36 V battery 12 aging, it is also necessary to distribute the drawing of the electrical energy from the battery 12 between the various cells. The 36 V battery 12 is thus regarded in the following text as three separate 12 V parts in a common housing. In this case, the aim is to ensure that each 12 V part is switched alternately, in order to additionally form the 12 V energy storage functionality as part of the electrical 36 V energy storage system. This modified fundamental idea with switching regulation for power distribution is illustrated in this context in FIG. 2. In conjunction with an intelligent switching regulator 17 which, for example, can be implemented using MOSFET switching elements 18 or relay switching elements 19, it is now possible to use the 36 V battery 12 as an electrical energy storage device for the 42 V part and for the 14 V part of the electrical system for the vehicle, without any need for charging differences or aging problems. A battery indication and monitoring system may in this case be used to ensure that the switching between the three battery parts 13, 14, 15 is controlled as a function of their state of charge.

However, an arrangement such as this is difficult when using electrical two-voltage energy storage systems within an electrical two-voltage system. The reason for this is the common grounding in modern vehicles. This is because the 36 V battery ground is connected to the vehicle chassis in this configuration. If the electrical 12 V energy storage functionality were to be provided in this case by the second 12 V part of the 36 V battery 12 (24 V-12 V), the first 12 V part of the 36 V battery 12 would be short-circuited. This requires a cable harness arrangement for each 14 load, because this load cannot be connected directly to the vehicle chassis. A solution such as this is undesirable for cost and standardization reasons and, instead, an improvement to this solution is provided.

The desired solution is thus intended in particular to avoid the charge differences and aging problems that have been mentioned, with a further aim in particular of avoiding the short-circuiting problem described above.

For this purpose, the invention provides for the power supply system 10 to have an intelligent switching regulator 17 for connection of each 12 V battery 13, 14, 15 in the 36 V battery 12 as the first 12 V part, which is annotated 16, between ground and 12 V. This final fundamental concept for the power supply system 10 according to the invention is illustrated schematically in this context in FIG. 3. In this case, the power supply system 10 according to the invention is illustrated schematically with a switching regulator for power distribution with a common ground. This for the first time provides the capability to produce a power supply system 10 which is equipped with a two-voltage energy storage system within an electrical two-voltage system while avoiding the disadvantages described above. In particular, this avoids the charge differences and aging problems which have been mentioned, as well as the short-circuiting problem which has been described. The arrangement according to the invention can also be produced easily and at low cost, while being highly reliable and having a long life.

The intelligent switching regulator 17 for the power supply system 10 may have a number of multiple MOSFET switching elements 18 and/or relay switching elements 19 (in this context, see for example the embodiments that are still to be described with reference to FIGS. 4 to 6 of the drawing), via which the power supply system according to the invention 10 can be implemented particularly advantageously with a two-voltage energy storage system.

Figure 4:
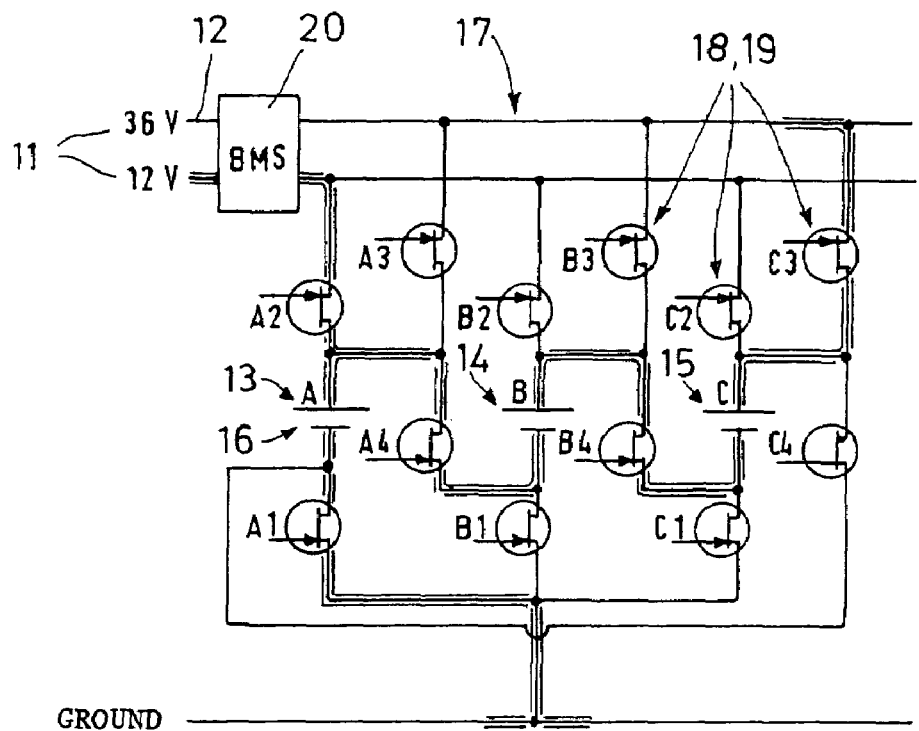
FIG. 4 is a circuit schematic of a first embodiment of a switching arrangement of an intelligent switching regulator according to the present invention.

The embodiment shown in FIG. 4 of the drawing now provides for the intelligent switching regulator 17 in the power supply system 10 to be designed to connect the first 12 V battery 13 as the first 12 V part 16 between ground and 12 V. The 12 V energy storage functionality is thus provided in this case via this first 12 V battery 13, which is connected as the first 12 V part 16 between ground and 12 V. The first 12 V battery 13 is in this case connected to ground via the multiple MOSFET switching elements 18 and/or the relay switching elements 19 A1 and A2, which are referred to in the following text only as the switching elements A1, A2, . . . , as is also shown by the associated switching states in FIG. 7, while, based on the 36 V level, the third 12 V battery 15 is connected via the switching element C3, with the second 12 V battery 14 also being connected via the switching element B4 and a connection for the first 12 V battery 13 then being made via the switching element A4. All of the other switching elements A3, B2, B3, C2, C4, C1 and B1 are in the switching state 0 in this embodiment.

Figure 5:
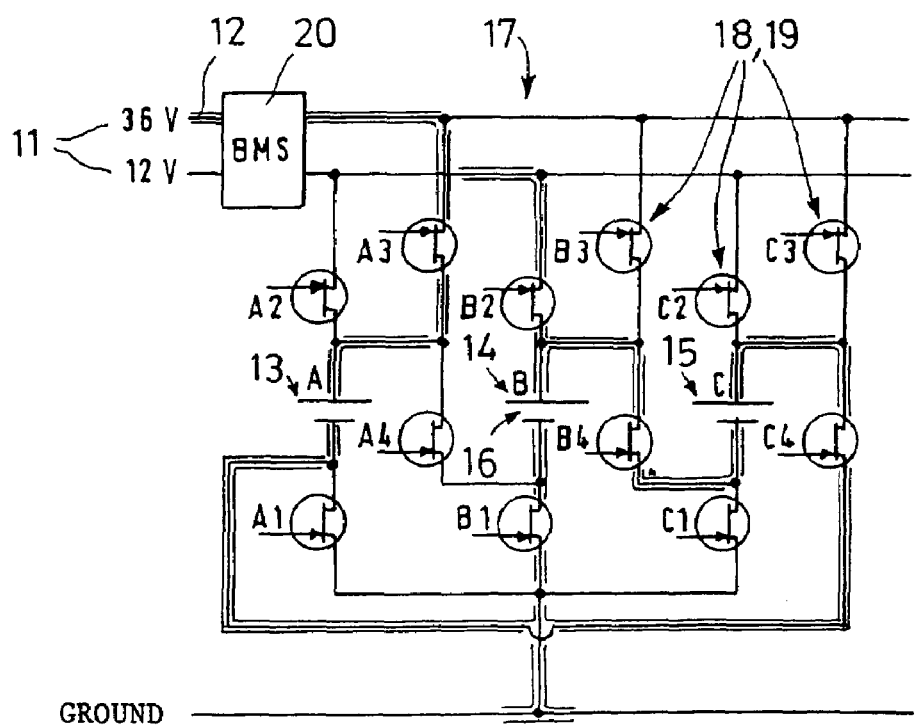
FIG. 5 is a circuit schematic of a second embodiment of a switching arrangement of an intelligent switching regulator according to the present invention.

The embodiment shown in FIG. 5 of the drawing provides for the intelligent switching regulator 17 in the power supply system 10 to be designed to connect the second 12 V battery 14 as the first 12 V part 16 between ground and 12 V. The 12 V energy storage functionality is thus in this case provided via this second 12 V battery 14, which is connected as the first 12 V part 16 between ground and 12 V. In this case, the second 12 V battery 14 is connected to ground via the switching elements B2 and B1 (see also the associated switching states in FIG. 7) while, based on the 36 V level, the first 12 V battery 13 is connected via the switching element A3, with the third 12 V battery 15 also being connected via the switching element C4 and a connection for the second 12 V battery 14 then being produced via the switching element B4. All the other switching elements A2, B3, C2, C3, C1, A4 and A1 are in the switching state 0 in this embodiment.

The embodiment shown in FIG. 6 of the drawing provides for the intelligent switching regulator 17 in the power supply system 10 to be designed to connect the third 12 V battery 15 as the first 12 V part 16 between ground and 12 V. The 12 V energy storage functionality is thus in this case provided via this third 12 V battery 15, which is connected as the first 12 V part 16 between ground and 12 V. In this case, the third 12 V battery 15 is connected to ground via the switching elements C2 and C1 (see the associated switching states in FIG. 7 once again), while, based on the 36 V level, the second 12 V battery 14 is connected via the switching element B3, the first 12 V battery 13 is then connected via the switching element A4, and a connection for the third 12 V battery 15 is then provided via the switching element C4. All the other switching elements A2, A3, B2, C3, B4, B1 and A1 are in the switching state 0 in this embodiment.

The intelligent switching regulator 17 in the power supply system 10 has (in this context, see in particular FIG. 4, 5, or 6 of the drawing once again) a battery indication and monitoring system 20 for alternate switching of the three 12 V batteries 13, 14, 15 in the 36 V battery 12, which battery indication and monitoring system 20 controls the alternate switching of the three 12 V batteries 13, 14, 15 as a function of their state of charge. The intelligent switching regulator 17 in the power supply system 10 may in this case have a sufficiently high switching frequency that the battery indication and monitoring system 20 is not required for alternate switching overnight for balance equalization of the energy storage.

The intelligent switching regulator 17 in the power supply system 10 may have a very short switching time, in order to avoid Voltage fluctuations on the 14 V side of the system, in particular when specific load demands occur (for example lighting, additional fans in the interior etc.). Alternatively or additionally, the intelligent switching regulator 17 in the power supply system 10 may have a device 21 for PWM matching, in order to avoid voltage fluctuations on the 14 V side of the system. This avoids the voltage drops which occur when switching between the individual 12 V parts 13, 14, 15, with the switching strategy being based on the information obtained from the battery indication and monitoring system 20. In this context, FIG. 8 of the drawing dramatically illustrates the device 21 for PWM matching for the intelligent switching regulator 17 for the power supply system 10, with the pulse pattern being 100% and 0% in the left-hand illustration, 70% and 30% in the second illustration, 30% and 70% in the third illustration, and 0% and 100% in the fourth illustration, as a result of the indicated switching frequencies for the switching elements A and B.

When a vehicle is not in use, generally all of remaining loads in the vehicle are on the 14 V side of the vehicle electrical system. These remaining loads mainly comprise control elements, alarm systems and remotely controlled locking systems. A further refinement feature of the present invention therefore provides that the intelligent switching regulator 17 in the power supply system 10 to be designed for parallel connection of the first, second and third 12 V batteries 13, 14, 15 when the vehicle is not in use and in order to assist cold starting, for example of large (diesel) engine. A refinement such as this results in various advantages. On the one hand, the parallel connection of the three 12 V batteries 13, 14, 15 results in the battery capacity being provided in three ways and the 12 V level, thus allowing the vehicle to be shut down for relatively long periods, for example at airports. A further advantage is that, in this operating mode of the system, the three different 12 V parts 13, 14, 15 will be able while the vehicle is not in use to balance their state of charge overnight by charge switching, and thus change themselves to the same state of charge. This includes the idea that a switching frequency sufficiently high means that the battery indication monitoring system 20 is not required for balance equalization of the energy storage overnight. This results in a uniformly distributed charge output from the three alternately switchable 12 V batteries 13, 14, 15 (which, according to a further refinement feature of the present invention are preferably identical) in the 36 V battery 12 in the power supply system 10. However, this parallel connection of the first, second and third 12 V batteries 13, 14, 15 is also used to assist cold starting, for example, of large (diesel) engines, to be precise in particular in winter, when the electrical 42 V unit is not able to start the engine, owing to high engine friction. As soon as the engine has been started, the energy storage device will immediately be switched to its 12/36 V application.

In this context, FIG. 9 of the drawing schematically shows the circuit arrangement of the intelligent switching regulator 17 in this embodiment of the power supply system 10 according to the invention, and FIG. 10 shows the associated switching states. In this circuit diagram, the three 12 V batteries 13, 14, 15 are arranged in parallel and are connected to the ground, to be precise the first 12 V battery 13 via the switching elements A2 and A1, the second 12 V battery 14 via the switching elements B2 and B1, and the third 12 V battery 15 via the switching elements C2 and C1. All of the other switching elements A3, A4, B3, B4, C3 and C4 are in the switching state 0. In this embodiment, the actual starter motor may be omitted for small diesel engines or Otto-cycle engines.

Figure 12:
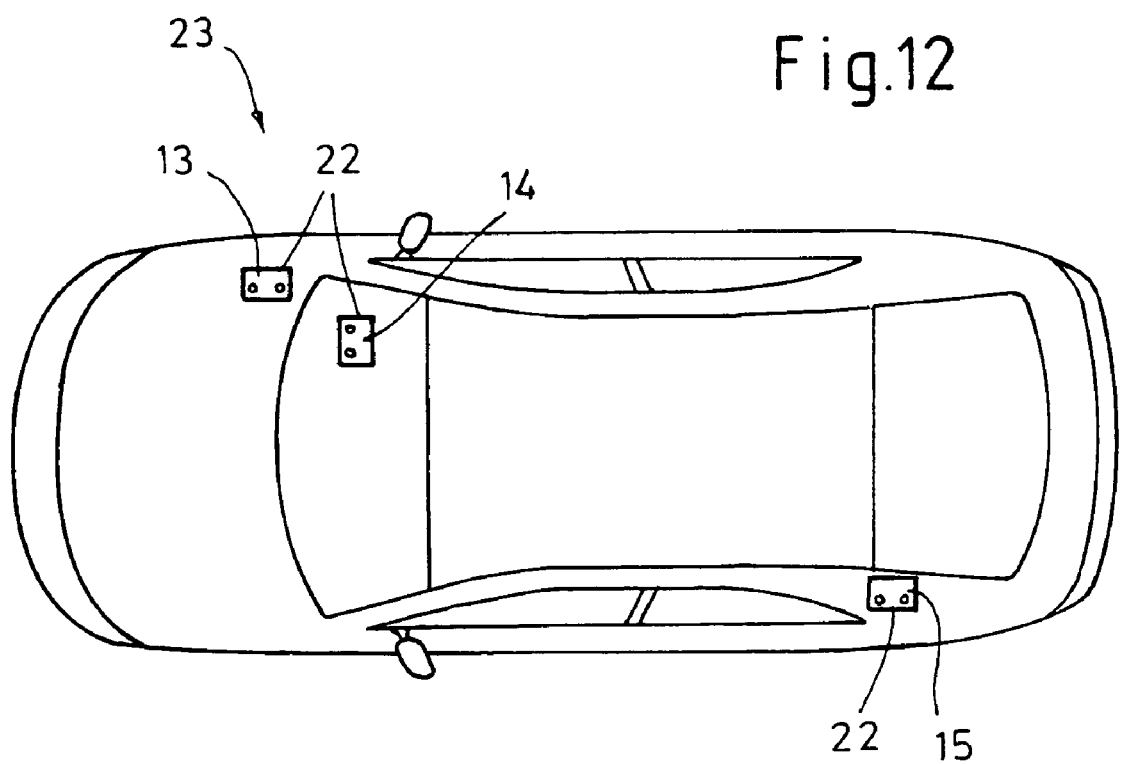
FIG. 12 is a schematic plan view of a vehicle with one exemplary battery accommodation arrangement for the power supply system according to the invention.

A further embodiment of the power supply system 10 according to the invention provides for the three alternately switchable 12 V batteries 13, 14, 15 in the 36 V battery 12 in the power supply system 10 to be arranged in two or three separate housings 22, in which context reference should be made to FIG. 11 of the drawing, which shows a three-part embodiment. Overall, the arrangement according to the invention results in the advantage of greater battery accommodation flexibility. Because it is becoming evermore difficult in modern vehicles to accommodate the batteries in the engine bay, this has resulted in the requirement for the batteries to be positioned at other points. The power supply system 10 according to the invention for vehicles with a two-voltage storage system makes it possible for the vehicle manufacture to redesign the battery housing, for example as mentioned, in one, two or three housings, in order to accommodate the battery in any desired available spaces. Putting the 36 V battery 12 into, for example, three smaller 12 V battery housings 22 in this case has no influence on the functionality of the energy storage system, and the only condition is that the batteries emit approximately the same power. In this context, FIG. 12 of the drawing shows an example of the accommodation of a 36 V battery, which has been split into three smaller 12 V battery housings 22, in a vehicle 23 with an electrical two-voltage system. In this context, the FIG. shows a plan view of a vehicle with one possible battery accommodation arrangement of the power supply system 10 according to the invention, with the three smaller 12 V battery housings 22 being arranged in the engine bay, in the interior and in the trunk area of the vehicle.

As already mentioned, the described embodiments represent only examples of implementations of the invention, which is not restricted to these embodiments and in fact, a number of modified forms and developments are also possible. In particular, the intelligent switching regulator 17 may have a configuration or circuitry differing from the described embodiments, and, in particular, different embodiments and arrangements of the individual 12 V batteries 13, 14, 15 and of their housings 22 are also feasible.

LIST OF REFERENCE SYMBOLS

10 Power supply system
11 14/42 V two-voltage system (for 10)
12 36 V battery
13 First 12 V battery
14 Second 12 V battery
15 Third 12 V battery
16 First 12 V part between ground and 12 V
17 Intelligent switching regulator (for 10)
18 MOSFET switching element
19 Relay switching element
20 Battery indication system
21 Device for PWM matching
22 Separate housing (for 13, 14, 15)
23 Vehicle

What is claimed is:

1. A multi-voltage power supply system for providing at least a first output at a first potential and a second output at a second potential higher than the first potential, the first and second potentials having a common reference potential, the power supply comprising:
   a battery arrangement having an output substantially equal to the second potential, said battery arrangement comprising a plurality of segments each providing an output substantially equal to the first potential; and
   a switching regulator for selectively configuring each of said segments as a first part of the battery arrangement having a potential difference determined with respect to the first potential and the common reference potential such that the power supply system provides the first and second outputs while minimizing degradation of said segments.

2. The power supply system according to claim 1, wherein said switching regulator comprises means for selectively configuring each of said segments as the first part of the battery arrangement depending upon state of charge of said segments.

3. The power supply system according to claim 1, wherein said switching regulator comprises means for using a switching frequency for selectively configuring each of said segments as the first part of the battery arrangement.

4. The power supply system according to claim 1, wherein said switching regulator comprises means for using a switching time for avoiding voltage fluctuations in the first output of said power supply system.

5. The power supply system according to claim 1, wherein said switching regulator comprises means for using PWM matching for avoiding voltage fluctuations in the first output of said power supply system.

6. The power supply system according to claim 1, wherein said segments are arranged in a single housing.

7. The power supply system according to claim 1, wherein said segments are arranged in separate housings.

8. The power supply system according to claim 1, wherein the system is adaptable for vehicular applications.

9. The power supply system according to claim 1, wherein the first and second outputs are compatible with 14V/42V vehicular applications.

10. The power supply system according to claim 1, wherein the common reference potential corresponds to an electrical ground.

11. A dual-voltage power supply system for providing at least a first output at a first potential and a second output at a second potential higher than the first potential, the first and second potentials having a common ground, the power supply system comprising:
    a battery arrangement having an output substantially equal to the second potential, said battery arrangement comprising at least three segments each providing an output substantially equal to the first potential; and
    a switching regulator for selectively configuring each of said segments as a first part of the battery arrangement having a potential drop determined with respect to the first potential and the common ground such that the power supply system provides the first and second outputs while minimizing degradation of said segments.

12. The power supply system according to claim 11, wherein the first potential is compatible with 14V vehicular applications, the second potential is compatible with 42V vehicular applications.

13. The power supply system according to claim 11, where said switching regulator comprises a plurality of MOSFET switching elements.

14. The power supply system according to claim 11, wherein said switching regulator comprises a plurality of relay switching elements.

15. The power supply system according to claim 11, wherein said switching regulator selectively configures a first of said segments as the first part of the battery arrangement between the first potential and ground.

16. The power supply system according to claim 11, wherein said switching regulator configures a second of said segments as the first part of the battery arrangement between the first potential and ground.

17. The power supply system according to claim 11, wherein said switching regulator selectively configures a third of said segments as the first part of the battery arrangement between the first potential and ground.

18. The power supply system according to claim 11, wherein said switching regulator selectively configures said segments as the first part of the battery arrangement depending upon their state of charge.

19. The power supply system according to claim 11, wherein said switching regulator uses a switching frequency for selectively configuring each of said segments as the first part of the battery arrangement.

20. The power supply system according to claim 11, wherein said switching regulator uses a switching time for avoiding voltage fluctuations in the first output of said power supply system.

21. The power supply system according to claim 11, wherein said switching regulator uses PWM matching for avoiding voltage fluctuations in the first output of said power supply system.

22. The power supply system according to claim 11, wherein the power supply system is used in a vehicle and said switching regulator configures the segments in parallel when the vehicle is stationary in order to assist cold starting of the vehicle.

23. The power supply system according to claim 11, wherein said segments are arranged in a single housing.

24. The power supply system according to claim 11, wherein said segments are arranged in separate housings.

25. The power supply system according to claim 11, wherein the segments are individual batteries.

26. A method of operating a power supply system to deliver at least a first output at a first potential and a second output at a second potential higher than the first potential, the first and second potentials having a common reference potential, the method comprising:
   dividing the power supply system into a plurality of segments each providing an output substantially equal to the first potential; and
   selectively configuring each of the segments as a first part of the battery arrangement having a potential difference determined with respect to the first potential and the common reference potential such that the power supply system provides the first and second outputs while minimizing degradation of the segments.

27. The method according to claim 26, wherein said configuring step comprises using state of charge of said segments for selectively configuring each of said segments as the first part of the battery arrangement.

28. The method according to claim 26, wherein said configuring step comprises using frequency for selectively configuring each of said segments as the first part of battery arrangement.

29. The method according to claim 26, wherein said configuring step comprises using a switching time to avoid voltage fluctuations in the first output of said power supply system.

30. The method according to claim 26, wherein said configuring step comprising using PWM matching to avoid voltage fluctuations in the first output of said power supply system.

31. The method according to claim 26, further comprises arranging said segments in a single housing.

32. The method according to claim 26, further comprises arranging said segments in a separate housing.

* * * * *